(12) United States Patent
Gowreesunker et al.

(10) Patent No.: US 9,797,753 B1
(45) Date of Patent: Oct. 24, 2017

(54) SPATIAL PHASE ESTIMATION FOR OPTICAL ENCODERS

(71) Applicant: Apple Inc., Cupertino, CA (US)

(72) Inventors: Baboo V. Gowreesunker, Cupertino, CA (US); Steven P. Hotelling, Cupertino, CA (US); Wayne C. Westerman, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 104 days.

(21) Appl. No.: 14/601,153

(22) Filed: Jan. 20, 2015

Related U.S. Application Data

(60) Provisional application No. 62/042,766, filed on Aug. 27, 2014, provisional application No. 62/044,876, filed on Sep. 2, 2014.

(51) Int. Cl.
G01D 5/38 (2006.01)
G01D 5/347 (2006.01)
G01B 11/26 (2006.01)

(52) U.S. Cl.
CPC ......... G01D 5/3473 (2013.01); G01B 11/26 (2013.01)

(58) Field of Classification Search
CPC .... G01D 5/3473; G01D 5/34707; G01D 5/36; G01D 5/04
USPC ....................... 250/231.13–231.18
See application file for complete search history.

(56) References Cited

U.S. PATENT DOCUMENTS

| | | |
|---|---|---|
| 3,056,030 A | 9/1962 | Kelchner |
| 4,133,404 A | 1/1979 | Griffin |
| 4,289,400 A | 9/1981 | Kubola et al. |
| 4,311,990 A | 1/1982 | Burke |
| 4,417,824 A | 11/1983 | Paterson et al. |
| 4,593,194 A | 6/1986 | Graham et al. |
| 4,617,461 A | 10/1986 | Subbarao et al. |
| 4,641,026 A | 2/1987 | Garcia, Jr. |
| 4,670,737 A | 6/1987 | Rilling |
| 4,884,073 A | 11/1989 | Souloumiac |
| 4,931,794 A | 6/1990 | Haag |
| 4,952,799 A | 8/1990 | Loewen |
| 4,980,685 A | 12/1990 | Souloumiac et al. |
| 5,034,602 A | 7/1991 | Garcia et al. |
| 5,214,278 A | 5/1993 | Banda |
| 5,288,993 A | 2/1994 | Bidiville et al. |

(Continued)

OTHER PUBLICATIONS

U.S. Appl. No. 61/645,033, filed May 9, 2012, 84 pages.

(Continued)

*Primary Examiner* — Seung C Sohn
(74) *Attorney, Agent, or Firm* — Brownstein Hyatt Farber Schreck, LLP

(57) ABSTRACT

Rotary encoders suitable for inclusion within small form factor devices (e.g., as input devices to small form factor electronic devices) are disclosed. In one aspect, a light source can illuminate a pattern on a rotatable shaft in order to reflect the pattern onto an array of optical sensors. Each optical sensor from the array of optical sensors can be polled at the same time to yield a snapshot vector. The snapshot vector can be projected onto a subspace spanned by two vectors selected in part on the pattern of the rotatable shaft and the distance separating the shaft and array. The resulting projection can be used to determine error and phase of the reflected pattern across the array of optical sensors. The phase of the reflected pattern can correlate to rotation of the shaft.

20 Claims, 8 Drawing Sheets

(56) References Cited

U.S. PATENT DOCUMENTS

| | | |
|---|---|---|
| 5,471,054 A | 11/1995 | Watanabe |
| 5,572,314 A | 11/1996 | Hyman et al. |
| 5,748,111 A | 5/1998 | Bates |
| 5,841,050 A | 11/1998 | Clift et al. |
| 5,847,335 A | 12/1998 | Sugahara et al. |
| 5,943,233 A | 8/1999 | Ebina |
| 5,963,332 A | 10/1999 | Feldman et al. |
| 6,175,679 B1 | 1/2001 | Veligdan et al. |
| 6,246,050 B1 | 6/2001 | Tullis et al. |
| 6,809,275 B1 | 10/2004 | Cheng et al. |
| 6,985,107 B2 * | 1/2006 | Anson ................. G01S 3/48 342/451 |
| 7,135,673 B2 | 11/2006 | Saint Clair |
| 7,265,336 B2 | 9/2007 | Hataguchi et al. |
| 7,528,824 B2 | 5/2009 | Kong |
| 7,761,246 B2 | 7/2010 | Matsui |
| 7,781,726 B2 | 8/2010 | Matsui et al. |
| 7,865,324 B2 * | 1/2011 | Lindberg ........... G01D 5/24452 318/127 |
| 8,138,488 B2 | 3/2012 | Grot |
| 8,368,677 B2 | 2/2013 | Yamamoto |
| 8,373,661 B2 | 2/2013 | Lan et al. |
| 8,441,450 B2 | 5/2013 | Degner et al. |
| 8,477,118 B2 | 7/2013 | Lan et al. |
| 8,487,237 B2 * | 7/2013 | Watanabe .......... G01D 5/34715 250/231.16 |
| 8,525,777 B2 | 9/2013 | Stavely et al. |
| 8,593,598 B2 | 11/2013 | Chen et al. |
| 8,666,682 B2 | 3/2014 | LaVigne et al. |
| 8,704,787 B2 | 4/2014 | Yamamoto |
| 8,711,093 B2 | 4/2014 | Ong et al. |
| 8,743,088 B2 | 6/2014 | Watanabe |
| 8,859,971 B2 | 10/2014 | Weber |
| 8,890,045 B2 | 11/2014 | Toh et al. |
| 8,895,911 B2 * | 11/2014 | Takahashi .......... G01D 5/24457 250/231.1 |
| 8,922,399 B2 | 12/2014 | Bajaj et al. |
| 8,994,694 B2 | 3/2015 | Lee et al. |
| 9,041,663 B2 | 5/2015 | Westerman |
| 9,086,738 B2 | 7/2015 | Leung et al. |
| 2005/0075558 A1 | 4/2005 | Vecerina et al. |
| 2006/0250377 A1 | 11/2006 | Zadesky et al. |
| 2007/0146348 A1 | 6/2007 | Villain |
| 2007/0222756 A1 | 9/2007 | Wu et al. |
| 2007/0236463 A1 | 10/2007 | Villain |
| 2008/0130914 A1 * | 6/2008 | Cho .................... G10L 21/0208 381/94.1 |
| 2008/0278445 A1 | 11/2008 | Sweetser et al. |
| 2009/0073119 A1 | 3/2009 | Le et al. |
| 2009/0152452 A1 * | 6/2009 | Lee ......................... G01D 5/04 250/231.15 |
| 2010/0149099 A1 | 6/2010 | Elias |
| 2012/0113044 A1 | 5/2012 | Strazisar et al. |
| 2013/0127713 A1 | 5/2013 | Yang |
| 2014/0071050 A1 | 3/2014 | Armstrong-Muntner |
| 2014/0132516 A1 | 5/2014 | Tsai et al. |
| 2014/0268150 A1 | 9/2014 | Leung et al. |
| 2014/0300903 A1 * | 10/2014 | Shimizu ................. G01D 5/266 356/498 |
| 2014/0327630 A1 | 11/2014 | Burr et al. |
| 2015/0051671 A1 | 2/2015 | Browne et al. |
| 2016/0061636 A1 | 3/2016 | Gowreesunker et al. |
| 2016/0306437 A1 | 10/2016 | Zhang et al. |
| 2017/0115757 A1 | 4/2017 | Armstrong-Muntner |

OTHER PUBLICATIONS

DeskThorityNet, Optical Switch Keyboards, http://deskthority.net/keyboards-f2/optical-switch-keyboards-t1474.html, 22 pages.
Epstein et al., "Economical, High-Performance Optical Encoders," Hewlett-Packard Journal Oct. 1988, pp. 99-106 [text only version].
Krishnan et al., "A Miniature Surface Mount Reflective Optical Shaft Encoder," Hewlett-Packard Journal, Dec. 1996, Article 8, pp. 1-6.
DeskThorityNet, Optical Switch Keyboards, http://deskthority.net/keyboards-f2/optical-switch-keyboards-t1474.html, Jul. 11, 2015, 22 pages.

* cited by examiner

SPATIAL PHASE ESTIMATION FOR OPTICAL ENCODERS

CROSS-REFERENCE TO RELATED APPLICATIONS

This application is a nonprovisional patent application of and claims the benefit to U.S. Provisional Patent Application No. 62/042,766, filed Aug. 27, 2014, and titled "Spatial Phase Estimation for Optical Encoders," and U.S. Provisional Patent Application No. 62/044,876, filed Sep. 2, 2014, and titled "Spatial Phase Estimation for Optical Encoders," the disclosures of which are hereby incorporated herein in their entireties.

TECHNICAL FIELD

The present disclosure relates generally to input devices for electronic devices, and more particularly, to systems and methods for determining the angular displacement of a rotatable object.

BACKGROUND

Many electronic devices can include a sensor to detect rotational input. For example, an electronic device can include a rotary encoder to determine the angular velocity of a rotatable component associated with the electronic device. Conventional rotary encoders can include a light source and an optical sensor.

The light source can illuminate a portion of a patterned surface of the rotatable component. The optical sensor can collect light reflected by the patterned surface and generate electrical signals corresponding to the collected light, which then can be conveyed to the electronic device. The electronic device can analyze the received electrical signals for sequences of rising and falling edges to determine or estimate the angular velocity and/or direction of rotation of the rotatable component.

However, many encoders are not suitable for use within the constrained proportions of an electronic device having a small form factor. As one example, smaller light sources may emit less light, smaller optical sensors may detect less light, and smaller rotatable components with patterned surfaces may be more difficult and/or expensive to manufacture. Furthermore, as angular velocity increases, the contrast of the light reflected by the patterned surface and collected by the optical sensor can decrease. As a result, the accuracy, precision, and/or reliability of angular velocity measurements derived from the optical sensor data can decrease with the size of the rotary encoder. In other examples, small form factor rotary encoders may be limited to low-speed operation.

Accordingly, there may be a present need for an improved rotary encoder suitable for inclusion within small form factor devices.

SUMMARY

Embodiments described herein may relate to, include, or take the form of an optical encoder including at least a rotating shaft having a patterned surface, a light source positioned below the rotating shaft and configured to illuminate the patterned surface, an array of optical sensors positioned below the rotating shaft and each configured to receive at least a portion of a reflection of the patterned, and a processor configured to perform the operations of capturing a snapshot vector, each entry corresponding to an output of a respective one of the array of optical sensors, determining the projection of the snapshot vector onto a selected subspace, and determining a phase for the snapshot vector based at least in part on a ratio of scalar coefficients of the determined projection.

Similar embodiments may include a configuration in which the processor is configured to perform the operations of capturing a plurality of snapshot vectors, determining the projection of each of the plurality of snapshot vectors onto a selected subspace, determining a phase for each snapshot vector based at least in part on a ratio of scalar coefficients of the determined projection, and determining a rotation of the rotating shaft based on the determined phase.

Further embodiments described herein may relate to, include, or take the form of a method for determining the position of a pattern relative to a plurality of sensors, including at least the operations of capturing a snapshot vector, each entry corresponding to an output of a respective one of the plurality of sensors, determining the projection of the snapshot vector onto a selected subspace, and determining the phase of the pattern based on a ratio of scalar coefficients of the determined projection.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

DETAILED DESCRIPTION

Figure 1:
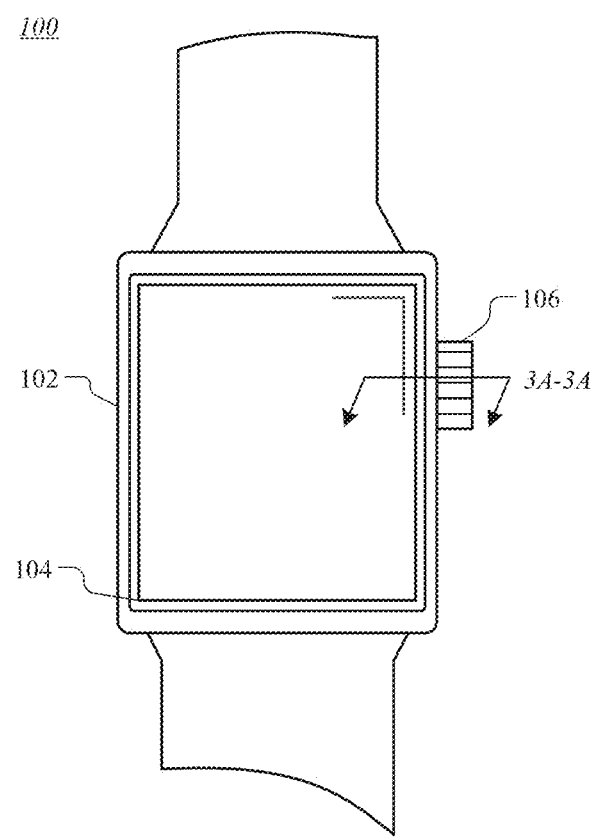
FIG. 1 depicts a top plan view of an example electronic device configured to receive rotation of a dial as user input.

Embodiments described herein relate to systems and methods for determining the angular displacement of a rotatable object. It should be appreciated that the various embodiments described herein, as well as functionality, operation, components, and capabilities thereof, may be combined with other elements as necessary. Thus, any physical, functional, or operational discussion of any element or feature is not intended to be limited solely to a particular embodiment to the exclusion of others. More particularly, although many embodiments described herein are suitable for use with small form factor electronic devices, the various systems and methods described are not limited to particular form factors and can apply equally to larger embodiments.

Embodiments discussed herein may include a rotary input mechanism that may be manipulated by a user to provide user input. Certain embodiments may include an optical encoder to detect rotational movement. In some devices, an optical encoder can be used to detect rotational movement, direction and/or speed of a component of the electronic device.

Many embodiments described herein include a rotatable shaft, a light source, and an array of optical sensors. The shaft can be configured to rotate about a single axis. The shaft can include an external surface having a selected pattern. For example, pattern can include a number of light and dark markings or stripes that are axially aligned along the shaft. Each stripe or combination of stripes on the shaft may be used to identify a position of the shaft. In these embodiments, the light source can illuminate the patterned surface in order to reflect the pattern onto the array of optical sensors. The array of optical sensors can then generate electrical signals corresponding to the collected light, which then can be conveyed to the electronic device.

Some embodiments disclosed herein may be sized and suitable for use within the constrained proportions of an electronic device having a small form factor. With respect to certain embodiments, smaller light sources may emit less light, smaller optical sensors may detect less light, and smaller shafts with patterned surfaces may be more difficult and/or expensive to manufacture. Furthermore, as angular velocity increases, the contrast of the light reflected by the patterned surface and collected by the optical sensor can decrease.

In addition, as the size of the optical sensor and/or light source decreases, the embodiment may compensate for, or otherwise take into account, undesirable effects of increased noise. As one example of noise, slight variations in the rotation of the shaft (e.g., "wobble") can be interpreted by the optical sensor as increases or decreases in speed Some embodiments described herein relate to methods for operating an optical encoder. In one embodiment, a snapshot of light information may be recorded from each optical sensor at a particular time and stored in a snapshot vector. In other words, for a particular snapshot, all optical sensors can be read simultaneously. Thereafter, the analog values corresponding to the light detected by each optical sensor can be converted into digital values by an analog-to-digital converter ("ADC"). In one embodiment, the digital values of a snapshot can correspond to a brightness measurement of light at each of the optical sensors. In another embodiment, the digital values of a snapshot can correspond to other information such as color, brightness, modulation frequency, measurements of diffusion and/or focus, and so on.

A snapshot vector may next be filtered via subspace projection. More particularly, the projection of the snapshot vector onto a suitable subspace of the same dimension can be calculated. In many embodiments, an appropriate projection subspace may be defined, at least in part, by the expected reflection of the patterned surface onto the optical sensor. In certain embodiments, while performing the projection calculation, scaling factors (e.g., inner products of the snapshot vector with each respective spanning vector) can be saved. Thereafter, the arctangent of the ratio of the scaling factors can be computed to find the phase for the snapshot vector.

The methods described broadly herein may be repeated such that individual snapshots (and the calculated phase thereof) may be processed in quick succession. As one example, a large number of sequential snapshots may be taken at a particular sampling rate.

The phase of each snapshot can filtered or further processed before being conveyed to an electronic device as a phase signal. In some embodiments, other filters can be applied. Upon rotation of the shaft, the phase signal may appear to the electronic device as a substantially saw-tooth wave (e.g., repeating ramp function), representing phases (of the patterned surface over the optical sensor array) cycling from $-\pi$ to $\pi$ (or $-180$ degrees to $180$ degrees).

In many embodiments, the phase signal can be a scalar multiple of the rotation of the shaft. More particularly, if the patterned surface is substantially sinusoidal, repeating sixteen times over the surface of the shaft, a phase of $-\pi$ to $\pi$ in the phase signal may correlate to one sixteenth of a rotation of the shaft. As a result, in certain embodiments, the phase signal may be scaled into a position signal. A position signal may correlate directly angular changes of the shaft itself.

The electronic device can receive the phase signal, position signal, and/or other signals derived therefrom and perform one or more functions in response. As noted above, many useful signals may be derivable from the phase signal. Accordingly, many embodiments may include an optical encoder configured to convey only a phase signal to the electronic device. In some embodiments, an optical encoder can convey multiple signals to the electronic device so that the electronic device need not process the phase signal further.

FIG. 1 depicts a top plan view of an example electronic device 100. In the illustrated embodiment, the electronic device may be implemented as a portable electronic device that is adapted to be worn by a user. Some embodiments can implement the electronic device differently. For example, the electronic device can be a smart phone, a gaming device, a digital music player, a sports accessory device, a medical device, a device that provides time and/or weather information, a health assistant, a tablet computing device, a notebook computer, an appliance, and other types of electronic device suitable for receiving user input. As described herein the user input can be a rotational user input.

In some embodiments, the electronic device 100 need not necessarily receive user input. For example, the electronic device can measure rotation as a rotation sensor in order to determine the rotation or angular change of another object. For example, the electronic device 100 can be attached to a camera gimbal to determine the angle of the camera. In another example, the electronic device can be attached to a wheel or rotor in order to determine the speed and/or direction of the wheel. Accordingly, embodiments described herein need not be limited to or configured for use with particular electronic devices or particular electronic device types. To the contrary, the embodiments, systems, and methods described herein may be broadly applicable to measure, determine, derive, or estimate rotation information of any rotating body.

As illustrated, electronic device 100 is configured in the form of a wearable communications device. The wearable communications device may include a processor coupled with or in communication with a memory, one or more sensors, one or more communication interfaces, output devices such as displays and speakers, one or more input devices, and a health monitoring system. The communication interface(s) can provide electronic communications between the communications device and any external communication network, device or platform such as, but not limited to, wireless interfaces, Bluetooth interfaces, USB interfaces, Wi-Fi interfaces, TCP/IP interfaces, network communications interfaces, or any conventional communication interfaces. The wearable communications device may provide information regarding time, health, statuses or externally connected or communicating devices and/or software executing on such devices, messages, video, operating commands, and so forth (and may receive any of the foregoing from an external device), in addition to communications.

The electronic device 100 includes a housing 102 at least partially surrounding a display 104. In many examples, the display 104 may incorporate an input device configured to receive touch input, force input, temperature input, and the like. The electronic device 100 may also include one or more buttons or input devices (not shown). The housing 102 can form an outer surface or partial outer surface and protective case for the internal components of the electronic device 100. In the illustrated embodiment, the housing 102 is formed into a substantially rectangular shape, although this configuration is not required. For example, certain embodiments may include a substantially circular housing 102

The electronic device 100 can also include a crown 106 or other rotary input that is configured to rotate about an axis. For example, if the display 104 of the electronic device 100 is displaying a time keeping application, the crown 106 may be rotated in either direction to change or adjust the position of the hands or the digits that are displayed for the time keeping application. In some examples, the crown 106 may be positioned off-center with respect to the housing 102, although this configuration is not required.

In some embodiments, the crown 106 may be rotated to move a cursor or other type of selection mechanism from a first displayed location to a second displayed location in order to select an icon or move the selection mechanism between various icons that are presented on the display 104.

Figure 2:
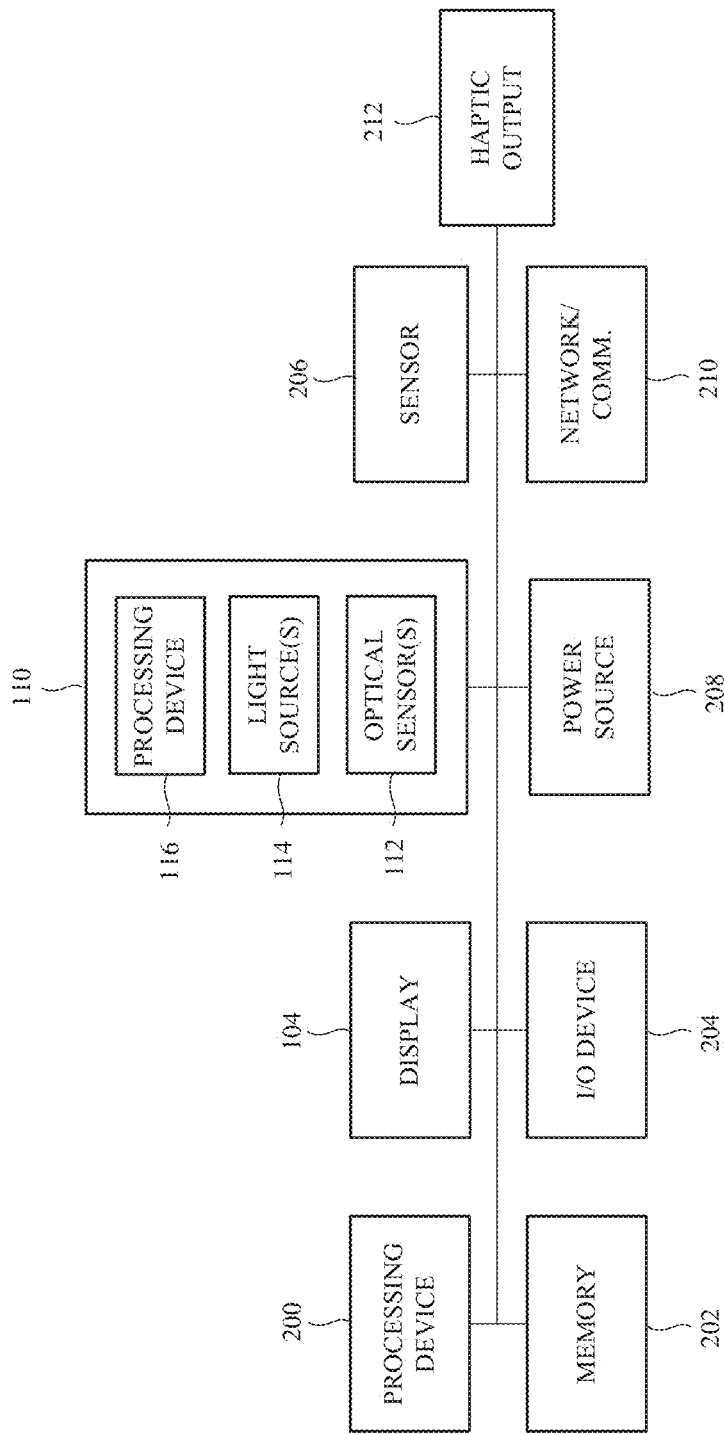
FIG. 2 is an illustrative block diagram of the example electronic device depicted in FIG. 1.

FIG. 2 is an illustrative block diagram of the electronic device 100 shown in FIG. 1. The electronic device 100 can include the display 104, one or more processing devices 200, memory 202, one or more input/output (I/O) devices 204, one or more sensors 206, a power source 208, a network communications interface 210, and a haptic output device 212. The display 104 may provide an image or video output for the electronic device 100. The display 104 may also provide an input surface for one or more input devices such as a touch sensing device, force sensing device, temperature sensing device, and/or a fingerprint sensor. The display 104 may be any size suitable for inclusion at least partially within the housing 102 and may be positioned substantially anywhere on the electronic device 100. In some embodiments, the display 104 can be protected by a cover glass formed from a scratch-resistant material (e.g., sapphire, zirconia, glass, and so on) that may form a substantially continuous external surface with the housing 102.

The processing device 200 can control or coordinate some or all of the operations of the electronic device 100. The processing device 200 can communicate, either directly or indirectly with substantially all of the components of the electronic device 100. For example, a system bus or signal line or other communication mechanisms can provide communication between the processing device(s) 200, the memory 202, the I/O device(s) 204, the sensor(s) 206, the power source 208, the network communications interface 210, and/or the haptic output device 212.

The one or more processing devices 200 can be implemented as any electronic device capable of processing, receiving, or transmitting data or instructions. For example, the processing device(s) 200 can each be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 202 can store electronic data that can be used by the electronic device 100. For example, a memory can store electrical data or content such as, for example, audio and video files, documents and applications, device settings and user preferences, timing and control signals or data for the haptic output device 212, data structures or databases, and so on. The memory 202 can be configured as any type of memory. By way of example only, the memory can be implemented as random access memory, read-only memory, Flash memory, removable memory, or other types of storage elements, or combinations of such devices.

The one or more I/O devices 204 can transmit and/or receive data to and from a user or another electronic device. The I/O device(s) 204 can include a touch sensing input surface such as a track pad, one or more buttons, one or more microphones or speakers, one or more ports such as a microphone port, and/or a keyboard.

The electronic device 100 may also include one or more sensors 206 positioned substantially anywhere on the electronic device 100. The sensor or sensors 206 may be configured to sense substantially any type of characteristic such as, but not limited to, images, pressure, light, touch, force, temperature, position, motion, and so on. For example, the sensor(s) 206 may be an image sensor, a temperature sensor, a light or optical sensor, an atmospheric pressure sensor, a humidity sensor, a magnet, a gyroscope, an accelerometer, and so on.

The power source 208 can be implemented with any device capable of providing energy to the electronic device 100. For example, the power source 208 can be one or more batteries or rechargeable batteries, or a connection cable that connects the remote control device to another power source such as a wall outlet.

The network communication interface 210 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, infrared, and Ethernet.

The haptic output device 212 can be implemented as any suitable device configured to provide force feedback, vibratory feedback, tactile sensations, and the like. For example, in one embodiment, the haptic output device 212 may be implemented as a linear actuator configured to provide a punctuated haptic feedback, such as a tap or a knock.

The electronic device 100 also includes an optical encoder 110 that consists of a processing device 116, a light source 114, and an optical sensor array 112. The processing device 116 can be in communication with the processing device 200 to convey information from the optical encoder 110 to the device 100. In other examples, the processing device 200 can perform all functions of the processing device 116. In such examples, processing device 116 may not be required or necessary.

The optical sensors of the an optical sensor array 112 can each be a photodiode, phototransistor, and/or an optical image sensor such as a charge-coupled device ("CCD") or complementary metal-oxide semiconductor ("CMOS") array. In other examples, more than one type of optical sensor can be used within the same array. The light source can be a light emitting diode or any other suitable light source. In other examples, more than one light source, emitting the same or different bands of light, can be used.

In many examples, the optical sensor array 112 can include eight individual optical sensors, although this configuration is not required of all embodiments, and optical sensor arrays containing fewer or more optical sensors are possible.

The optical sensor array 112 can be aligned in a row perpendicular to the axis of rotation of the shaft, although this configuration is not required. For example, the optical sensor array 112 can be aligned as two or more rows of individual optical sensors. In some examples, the optical sensor array 112 can be coupled to a bus or other communication line configured to convey data from each optical sensor of the optical sensor array 112 to the processing device 116.

The optical sensor array 112 can be separated from the shaft by a selected distance that can vary from embodiment to embodiment. For example, one may appreciate that light reflecting from the patterned surface can scatter or otherwise diffuse as a function of distance, which may reduce the contrast between unique features of the pattern's reflection measureable by the optical sensors. Thus, optimizing the distance between the optical sensor array and patterned surface in order to minimize the effects of scattering can improve the quality of the signal(s) output by the optical sensor array.

Figure 3A:
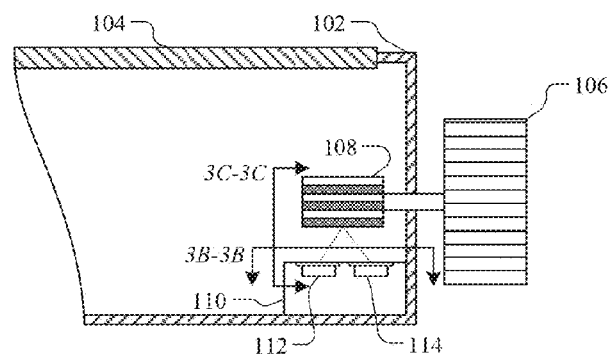
FIG. 3A depicts a side schematic cross-section of the example electronic device of FIG. 1 taken along line 3A-3A, showing an optical encoder positioned below a rotatable encoder wheel.

FIG. 3A depicts a side cross-section of the example electronic device 100 of FIG. 1 taken along line 3A-3A, showing an optical encoder positioned below a rotatable encoder wheel/cylinder ("wheel," herein). In some embodiments, the rotatable encoder can be positioned elsewhere relative to the encoder wheel. The electronic device 100 includes an optical encoder 110 that consists of a shaft 108, a light source 114 and an optical sensor array 112.

In certain embodiments, the optical encoder 110 can be used to determine rotation of the crown 106. As one example, the optical encoder 110 may be used to detect that movement of a shaft 108 that corresponds to movement of the crown 106 including, for example, the direction of the movement, speed of the movement and so on. The movement may be rotational movement, translational movement, and/or angular movement.

The optical encoder 110 may also be used to detect the degree of the change of rotation of the crown 106 and/or the angle of rotation of the crown 106 as well as the speed and the direction of the rotation of the crown 106. Once the movement data of the crown 106 is determined, one or more graphics, images or icons on the display 104 of the electronic device 100 may be updated or altered accordingly. In other example, the electronic device 100 can change the brightness of the display 104 or the volume output from one or more speakers. In other examples, the crown 106 may be rotated in a clockwise manner in order to advance the time displayed by the electronic device 100.

The optical encoder may include a shaft 108. The shaft 108 may be coupled to the crown 106 by any suitable means. For example, in some embodiments the shaft 108 and the crown 106 may be formed from two separate components, coupled together with an intermediate bar (as illustrated). In some embodiments, the shaft 108 can be an extension of the crown 106. That is, the crown 106 and the shaft 108 may be manufactured from a single piece.

The shaft 108 of the optical encoder 110 can be formed with a patterned external surface. As discussed, the patterned surface can be used to determine positional information about the shaft 108. The patterned surface may include a plurality of light and dark stripes such as shown in FIGS. 3A and 3C.

Although light stripes and dark stripes are specifically mentioned and shown, the patterned surface may consist of various types of stripes having various shades or colors that provide surface contrast. For example, the patterned surface may include a stripe or marking that has a high reflective surface and another stripe that has a low reflective surface regardless of the color or shading of the stripes or markings. In another embodiment, a first stripe of the patterned surface may cause specular reflection while a second stripe of the patterned surface may cause diffuse reflection.

In still further embodiments, the patterned surface can be formed onto the shaft 108 as one or more radially-variable surface characteristics. In these examples, the surface characteristic(s) of the shaft 108 can reflect light differently depending upon the angle of rotation of the crown 106. For example, instead of stripes having various shades, colors, or contrasts, certain embodiments can implement the patterned surface as a number of etched, machined or otherwise physically-implemented lines, structures or features (collectively referred to as "lines"). The lines can be etched into the surface (and/or deposited onto the surface) using any number of suitable methods such as laser etching, laser ablation, particle blast, chemical vapor deposition, chemical etching, and so on. In these examples, the lines may be formed such that adjacent lines have different reflective characteristics (e.g., specular or diffuse reflection, or varying degrees of specular or diffuse reflection). In other examples, other surface characteristics may be implemented. For example, some embodiments can machine grooves into the length of the shaft 108; such grooves may have different reflective characteristics than the unmachined portions of the shaft 108. Continuing this example, the grooves may diffuse light to a greater or lesser degree than the unmachined segments. In one non-limiting embodiment, the grooves may diffuse light. As one non-limiting option, this diffusion may occur due to small imperfections left behind or deliberately formed during the machining process, or due to deliberately-created surface features created during machining. Continuing the example, the grooves may be a series of scallops, semicircular shapes, semi-elliptical shapes, and so on that extend along the longitudinal axis of the shaft, such that a set of scallops or other shapes define a single groove. In other examples, the shaft 108 can be dimpled along its circumference. In still further examples, the shaft 108 can include a number of scalloped indentations having other orientations (for example, each groove may have a scalloped cross-section when viewed in a cross-section taken along a diameter of the shaft).

In some embodiments, and as illustrated, the stripes of the patterned surface extend axially along the shaft 108. The stripes may extend along the entire length of the shaft 108 or partially along a length of the shaft. In addition, the patterned surface may also be disposed around the entire circumference of the shaft 108. In some embodiments, the patterned surface may include a radial component. In yet some embodiments, the patterned surface may have both a radial component and an axial component.

In another embodiment, the patterned surface may be disposed only on certain areas of the shaft 108. For example, if a shaft 108 was configured to have partial rotational movement about an axis in a given direction (instead of full rotational movement about the axis such as described herein), the patterned surface may only be disposed on a portion of the shaft 108 that would be visible to the optical sensor array 112 as the shaft 108 is rotated.

The light and dark stripes of the patterned surface may alternate between a light stripe and a dark stripe. In another embodiment, the light stripes and the dark stripes of the patterned surface may be arranged in a particular order. In such embodiments, each section of the pattern may indicate a position of the shaft 108.

Figure 3B:
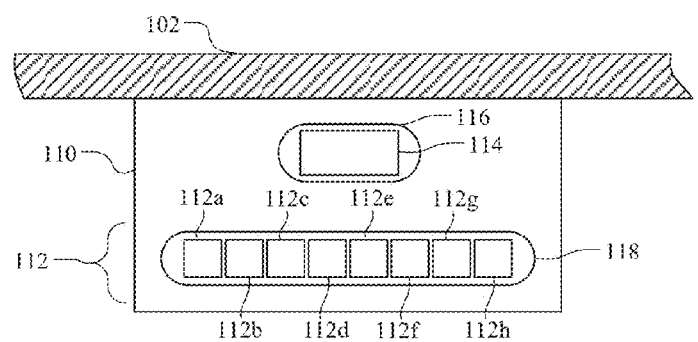
FIG. 3B depicts a top schematic view of the optical encoder of FIG. 3A taken along line 3B-3B.
Figure 3C:
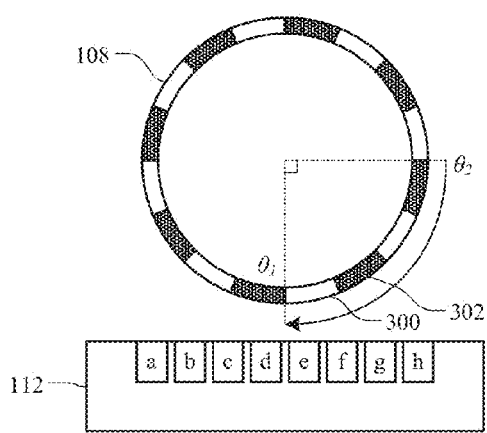
FIG. 3C depicts a side schematic view of the optical encoder and rotatable encoder wheel of FIG. 3A taken along line 3C-3C.

FIG. 3B depicts a top plan view of the optical encoder of FIG. 3A taken along line 3B-3B. As described above, the optical encoder 110 can be implemented with a light source 114 and an optical sensor array 112. As illustrated, the optical sensor array 112 can include eight independent optical sensing elements, the optical sensors 112a-112h, arranged in a single row. Although eight sensors are illustrated, other numbers of sensors can be possible. For example, certain embodiments can be implemented with fewer optical sensors and certain embodiments can be implemented with more optical sensors.

As noted with respect to some embodiments described herein, the optical sensors 112a-112h can each be implemented as photodiode, phototransistor, and/or an optical image sensor such as a charge-coupled device ("CCD") or complementary metal-oxide semiconductor ("CMOS") array. In other examples, more than one type of optical sensor can be used.

The optical sensors 112a-112h may be evenly spaced and can be centered, as a group, along the center of the light source 114 and the axis of rotation of the shaft 108, although this configuration is not required. For example, in some embodiments other alignments of the optical sensors 112a-112h are possible. For example, some embodiments can arrange the optical sensors 112a-112h as two or more rows of optical sensors. More particularly, two rows of four optical sensors may be used in certain embodiments. In these embodiments, the rows may be offset from one another. In other examples, the rows can be aligned. In still further embodiments, additional arrangements of the optical sensors and light source(s) can be used.

In many examples, the optical sensors 112a-112h can be covered or at least partially protected by with a lozenge-shaped lens 118. Similarly, the light source 114 can be covered or at least partially protected by a lozenge-shaped lens 116. The lenses 116, 118 can protect the light source 114 and the optical sensors 112a-112h from interference resulting from foreign matter accumulation over time (e.g., dust). In many examples, the lenses 116, 118 can be formed from an optically transparent material such as glass or plastic. In other examples, the lenses 116, 118 can take another shape or may be formed from another material. In still further embodiments, a single lens can cover or at least partially cover both the optical sensors 112a-112h and the light source 114. In still further embodiments, the lenses 116, 118 may not be required.

FIG. 3C depicts a side plan view of the optical encoder and rotatable encoder wheel of FIG. 3A taken along line 3C-3C. Counterpart to FIG. 3C is FIG. 3D, which depicts example waveforms that can be generated by components of the optical encoder of FIG. 3C upon rotation of a rotatable encoder wheel having an alternating black and white patterned surface.

Figure 3D:
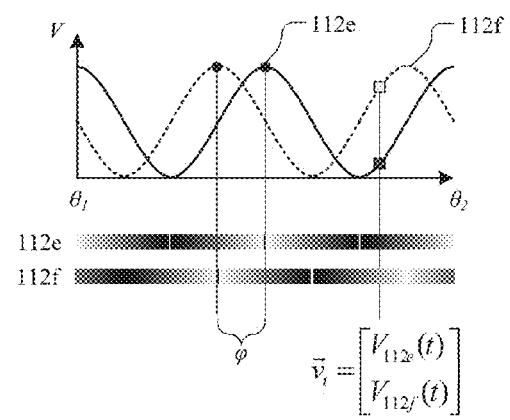
FIG. 3D depicts an example waveform that can be generated by the optical encoder of FIG. 3C upon rotation of the rotatable encoder wheel.

For clarity, the example waveforms illustrated in FIG. 3D correspond only to two optical sensors, the optical sensors 112e, 112f. However, one may appreciate that similar waveforms can be associated with the other optical sensors.

An example may aid in comprehension of the embodiment and certain characteristics. As an example, the optical sensors 112e, 112f are stationary while the shaft 108 rotates a quarter of a full revolution in the clockwise direction (e.g., $\pi/2$ radians or 90 degrees). One may appreciate that the quarter turn of the illustrated embodiment is merely provided as a single example. As one example, the methods and systems described herein are not limited to particular minimums of a full revolution. In other words, although FIG. 3C-3D are described with respect to a quarter turn of a full revolution of the shaft 108, a larger or smaller rotation is possible.

The initial position of the shaft 108, from the perspective of the optical sensors 112e, 112f, can be identified as a first angle $\theta_1$ and the final position of the shaft 108 can be identified as a second angle $\theta_2$. As the shaft 108 rotates in a clockwise direction (as shown), the portions of the patterned surface that are visible to the optical sensors 112e, 112f can shift from the right of the illustration to the left of the illustration.

As one example, because the optical sensors 112 are positioned in the illustration below the shaft 108, the patterned surface will move from left to right from the perspective of the optical sensors as the shaft 108 rotates clockwise. In this manner, the optical sensor 112f sees a portion of the patterned surface of the shaft 108 immediately before the optical sensor 112e sees the same pattern. In an alternative non-limiting phrasing, if the shaft 108 rotates clockwise, a signal from the optical sensor 112f will lead a signal from the optical sensor 112e by a certain amount.

While the shaft 108 is at the first angle $\theta_1$, the optical sensor 112e is closest to a white portion 300 of the patterned surface. Accordingly, at the first angle $\theta_1$, the brightness as observed by optical sensor 112e is at a maximum (see, e.g., FIG. 3D). At the angle $\theta_1$, however, the optical sensor 112f observes a brightness is neither fully white nor fully black because a portion of a black stripe 302 and a portion of the white stripe 300 are both visible to the optical sensor 112f. As the shaft 108 rotates toward the second angle $\theta_2$, the optical sensor 112f observes a brightness decrease, as the black stripe 302 of the patterned surface becomes nearer to the optical sensor 112f while the white stripe 300 moves farther away. Correspondingly, as the shaft 108 rotates toward the second angle $\theta_2$, the optical sensor 112e observes a brightness decrease, as the black stripe 302 of the patterned surface becomes nearer to the optical sensor 112e, and the white stripe becomes farther away from the optical sensor 112e.

As the shaft 108 continues to rotate toward the second angle $\theta_2$, the patterned surface of the shaft 108, from the perspective of the optical sensors 112e, 112f, may pass through two complete cycles of fully white to fully black. In other words, two complete periods of a sinusoidal (or pseudo-sinusoidal) wave. As a result of the physical separation of the optical sensors 112e, 112f, the sinusoidal wave produced by the optical sensor 112f leads the sinusoidal wave produced by the optical sensor 112e. In other words, the waveforms produced by the optical sensors 112e, 112f are (ideally) identical, separated by a phase offset φ. Importantly, the phase offset φ is measurable at any time during the rotation from the first angle $\theta_1$ to the second angle $\theta_2$ by comparing the relative voltage output V of each waveform to the measured frequency of one or both of the waveforms. As one example, by taking a snapshot of the values of the optical sensors 112e, 112f at any particular time t, a vector $\vec{v}_t$ can be used in conjunction with a measured frequency of either waveform to determine the phase offset φ between the two waveforms produced the optical sensors 112e, 112f.

As noted above, FIG. 3D is a limited example provided for clarity within the figures. In many embodiments, the vector $\vec{v}_t$ will have the same dimension as the number of optical sensors 112. As one example, for the illustrated embodiment, the $\vec{v}_t$ vector could contain eight entries.

One may appreciate that FIG. 3C may not be drawn to scale, specifically with respect to the relative size of the shaft 108 and the optical sensor array 112. More particularly, in certain embodiments, the optical sensor array 112 may be substantially smaller than the diameter of the shaft 108. In many embodiments, the width of the optical sensor array 112 can be selected at least in part on the periodicity of the patterned surface of the shaft 108.

Figure 4:
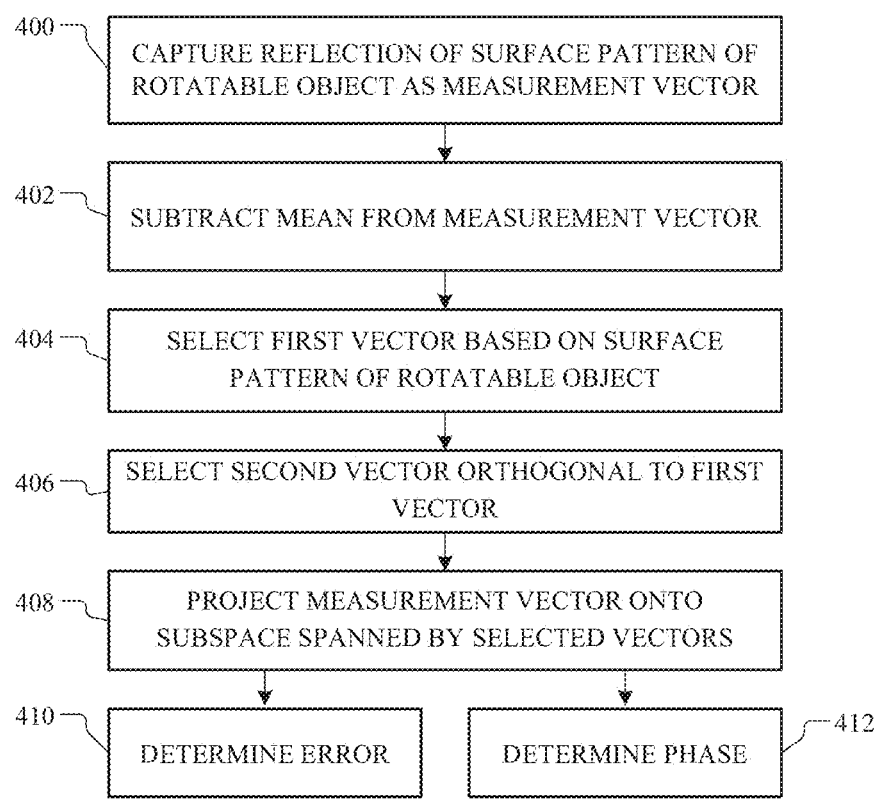
FIG. 4 is a flow chart depicting example operations of a method for determining the position of a moving pattern overlaid on or with a plurality of sensors.

FIG. 4 is a flow chart depicting example operations of a method for determining the position of a moving pattern overlaid a plurality of sensors. The method can begin at operation 400 in which a snapshot of light is recorded from each optical sensor of a plurality of optical sensors at a particular time. In other words, for a particular snapshot, all optical sensors can be read simultaneously. The digital values of a snapshot corresponding to each optical sensor can be stored in a snapshot vector of a dimension equal to the number of optical sensors of the particular embodiment. For example, if an embodiment implements eight optical sensors, a snapshot vector may contain eight elements.

The readings $x_0$-$x_n$ of the optical sensors can correspond to voltage output by each individual optical sensor (e.g., sensor 0 through sensor n). In other examples, the readings $x_0$-$x_n$ of the optical sensors can correspond to a resistance or a capacitive change output by each individual optical sensor. In one non-limiting embodiment, the snapshot vector can be modeled as:

$$\vec{v}_{snap} = \begin{bmatrix} x_0 \\ x_1 \\ \vdots \\ x_n \end{bmatrix} \quad \text{Equation 1}$$

In this example, the number of optical sensors is n+1. Further, as described above, the light and/or absence of light measurable by an individual optical sensor can depend on the contrast of the reflection of the patterned surface onto the particular optical sensor. For example, as shown and described with respect to FIGS. 3C-3D.

Thereafter, the analog values corresponding to the light detected by each optical sensor can be converted into digital values by an ADC. In one non-limiting phrasing, the values can correspond to an 'image' of the pattern reflected onto the optical sensor at a particular time. As noted above, the digital values of a snapshot can correspond to a brightness measurement of light at each of the optical sensors. In another embodiment, the digital values of a snapshot can correspond to other information such as color, brightness, modulation frequency, measurements of diffusion and/or focus, and so on.

A snapshot vector can be conditioned and/or normalized before further processing. For example, at operation 403, a direct current bias or other offset can be subtracted from each entry within the snapshot vector. As one example, the average μ of all entries within the vector can be subtracted from each entry. In one non-limiting embodiment, the normalized snapshot vector can be modeled as:

$$\vec{v}_{snap} - \mu = \begin{bmatrix} x_0 - \mu \\ x_1 - \mu \\ \vdots \\ x_n - \mu \end{bmatrix} \quad \text{Equation 2}$$

A snapshot vector may next be filtered via subspace projection. More particularly, as partially noted above, the projection of the snapshot vector onto a suitable subspace of the same dimension can be calculated after vectors spanning the desired subspace are selected. One may appreciate that orthogonal spanning vectors can simplify the projection calculation. As one example, because orthogonal spanning vectors have inner products equal to zero, the operations required to calculate the projection of the snapshot vector onto the selected subspace are the inner products of the snapshot vector and each individual spanning vector. In other words, orthogonal projections may be simpler to compute than oblique projections, especially as the dimensions of the vectors increase.

In certain embodiments, the dimension of each spanning vector is equal to the dimension of the snapshot vector. As one example, dimensional parity between the spanning vectors and the snapshot vector is required to compute the projection of the snapshot vector onto the subspace spanned by the spanning vectors.

For example, if a substantially sinusoidal distribution of light is expected across the optical sensor array as a result of the reflection of a particular pattern, a subspace spanned by two orthogonal sinusoidal (e.g., sine and cosine) vectors may be used to define a subspace projection filter. In one non-limiting embodiment, a suitable sinusoidal spanning vector can be modeled as:

$$\vec{s}_1 = \begin{bmatrix} A\sin(Bi_0 + C) + D \\ A\sin(Bi_1 + C) + D \\ \vdots \\ A\sin(Bi_n + C) + D \end{bmatrix} \quad \text{Equation 3}$$

In this example, the variables A, B, C and D define parameters of the sinusoidal wave (e.g., period, phase, frequency, DC offset, and so on). Similarly, a cosine vector that can be orthogonal to $\vec{s}_1$ such that $\langle \vec{s}_1, \vec{s}_2 \rangle = 0$ (e.g., inner product of $\vec{s}_1$ and $\vec{s}_2$ is zero) can be modeled as:

$$\vec{s}_2 = \begin{bmatrix} A\cos(Bi_0 + C) + D \\ A\cos(Bi_1 + C) + D \\ \vdots \\ A\cos(Bi_n + C) + D \end{bmatrix} \quad \text{Equation 4}$$

In further embodiments, non-orthogonal spanning vectors may be used, although it may be appreciated that because the inner product of orthogonal vectors is zero, a subspace filter defined by orthogonal vectors is computationally simpler, and may be preferable for certain embodiments. However, notwithstanding the potential differences in calculation time and complexity for certain embodiments, oblique projections may be used and preferred for use with some embodiments. In some embodiments, other vector spaces can be used. For example, a periodic signal with strong sinusoidal component can be used.

Some embodiments can utilize methods beyond orthogonal or oblique projections. For example, some embodiments can include overcomplete representations/dictionaries and/or sparse reconstruction methods.

Referring back to the method depicted in FIG. 4, a first vector (e.g., $\vec{s}_1$) can be selected at operation 404 based on, at least in part, the expected reflection of the patterned surface on the optical sensor. For example, if the expected reflection of a particular pattern is a sine wave that may be phase shifted depending upon the linear position of the reflection, then the first vector selected may be a sine wave having substantially the same period as the expected sine wave. As one example, if a particular pattern is expected to reflect one period $$\frac{B}{2\pi}$$

of a sine wave onto eight optical sensors, the first vector can be comprised of eight discrete entries corresponding to the values of the sine wave at $$\frac{B}{7}i,$$

where i is the index of the particular entry. The denominator of one less than eight (e.g., seven) can ensure that the entries at index 1 and index 8 are each at the endpoints of a particular period.

In another example, if the expected reflection of a particular pattern is a triangular wave that may be phase shifted depending upon the linear position of the reflection, then the first vector selected may be a triangular wave having substantially the same period as the expected triangular wave.

As noted above, the dimension of the first vector is equal to the dimension of the snapshot vector. As one example, dimensional parity between the spanning vector and the snapshot vector is required to compute the projection of the snapshot vector onto the subspace spanned by the first spanning vector. As one example, dimensional parity is required to compute an inner product, which is required to calculate a projection.

Referring back to the method depicted in FIG. 4, a second vector (e.g., $\vec{s}_2$) that is orthogonal to the first vector can be selected at operation 406 based on, at least in part, the expected reflection of the patterned surface on the optical sensor. As one example, if the first vector corresponds to a sine wave, the second vector can correspond to a cosine wave of the same amplitude, period, phase offset, and bias (e.g., A, B, C, D of Equations 1 and 2).

The projection of the snapshot vector may be computed at operation 408 by summing the scalar projections of the snapshot vector onto each of the first and second vectors. In another phrasing, the projection of the snapshot vector onto the selected subspace may be equal to the sum of each of the first and second vector scaled by a factor equal to the inner product of the snapshot vector and the respective spanning vector. In one non-limiting embodiment, the projection calculation can begin by defining a subspace S:

$$S = [\vec{s}_1 \vec{s}_2] \quad \text{Equation 5}$$

As noted above, the subspace can be spanned by the two vectors $\vec{s}_1$ and $\vec{s}_2$. Next, two scalar coefficients $\alpha_1$ and $\alpha_2$ can be defined as the inner products of the spanning vectors $\vec{s}_1$ and $\vec{s}_2$ and the snapshot vector $\vec{v}_{snap}$:

$$\alpha_1 = \langle \vec{v}_{snap}, \vec{s}_1 \rangle \quad \text{Equation 6}$$

$$\alpha_2 = \langle \vec{v}_{snap}, \vec{s}_2 \rangle \quad \text{Equation 7}$$

The scalar coefficients can then be used to calculate the projection of the snapshot vector $\vec{v}_{snap}$ onto the subspace S:

$$\text{Proj}_s \vec{v}_{snap} = \alpha_1 \vec{s}_1 + \alpha_2 \vec{s}_2 \quad \text{Equation 8}$$

Thereafter, the difference between the snapshot vector $\vec{v}_{snap}$ and the subspace projection of the snapshot vector can be determined at operation 410, for example modeled by Equation 9:

$$\vec{e} = \vec{v}_{snap} - \text{Proj}_s \vec{v}_{snap} \quad \text{Equation 9}$$

This difference $\vec{e}$ can represent the error (e.g., noise) within the snapshot vector. The error vector $\vec{e}$ can represent the sum of multiple error and/or noise sources including, but not necessarily limited to, rounding error from the ADC, power supply noise, measurement error resulting from manufacturing differences/defects of the light source, optical sensors, shaft, or patterned surface, each resulting in waveform distortions in the sinusoidal signal. The error vector can be used for optimization processes described herein.

As noted above, the projection of the snapshot vector may be computed by summing the scalar projections of the snapshot vector onto each spanning vector. In certain embodiments, while performing the projection calculation, the scaling coefficients $\alpha_1$ and $\alpha_2$ (e.g., inner products of the snapshot vector with each respective spanning vector) can be saved. Thereafter, at operation 412, the arctangent of the ratio of the scaling factors can be computed to find the phase offset between the entries of snapshot vector. For example:

$$\varphi_{offset} = \arctan\left(\frac{\alpha_1}{\alpha_2}\right) \quad \text{Equation 10}$$

In other words, the phase difference $\varphi_{offset}$ across the snapshot vector can correlate to the linear position of the reflection of the patterned surface onto the array of optical sensors, which in turn can correlate to the rotation of the shaft.

In an alternative non-limiting phrasing, the method depicted in FIG. 4 performs a subspace projection filter to assist with the computation of the phase and predicted error of a particular snapshot of values recorded from the optical sensor array.

Figure 5:
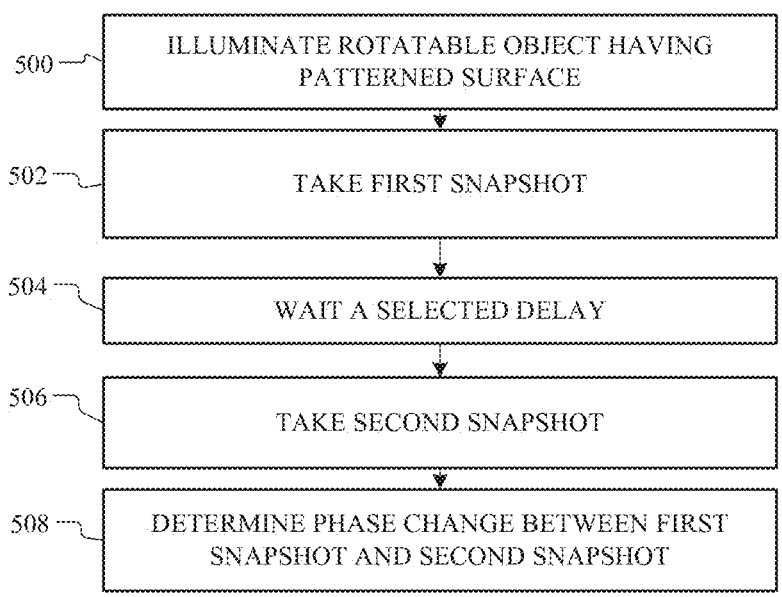
FIG. 5 is a flow chart depicting example operations of a method for determining the speed and direction of a spatial shift of a moving pattern overlaid on or with a plurality of sensors.

FIG. 5 is a flow chart depicting example operations of a method for determining the speed and direction of a spatial shift of a moving pattern overlaid a plurality of optical sensors. The method can begin at operation 500 in which a rotatable object, such as the shaft described with respect to some embodiments described herein, can be illuminated by a light source. The rotatable object can have a patterned surface such as the patterned surfaces shown in FIGS. 3A and 3C.

The method can continue to operation 502 which can take a first snapshot of values of the plurality of optical sensor. After waiting a selected delay at 504, a second snapshot can be taken at operation 506. Thereafter, the phase associated with both the first snapshot and the second snapshot can be calculated. At operation 508, the calculated phase can be compared to one another. For example, if the phase offset associated with the first snapshot is smaller than the phase for the second snapshot, the rotatable object may have rotated counterclockwise during the delay at 504. Similarly, if the phase for the second snapshot is smaller than the phase for the first snapshot, the rotatable object may have rotated clockwise during the delay at 504.

The method of FIG. 5 can be rapidly repeated such that individual snapshots (and the calculated phase thereof) may be processed in quick succession. As one example, a large number of sequential snapshots may be taken at a particular sampling rate. For example, certain embodiments may take several thousand snapshots per second. Some embodiments may take only a few snapshots per second.

In these examples, the sampling rate of snapshots (e.g., repetition of the method of FIG. 5) can be selected in part as a function of the minimum rotation expected of the shaft (e.g., minimum speed of rotation accepted as a rotation event). In other examples, the sampling rate of snapshots can be selected in part as a function of power usage of the optical encoder. In other words, a higher sampling rate may require more power and a lower sampling rate may require less power, each of which may be preferable in certain embodiments. In many examples, the sampling rate can vary dynamically or on a schedule.

Figure 6:
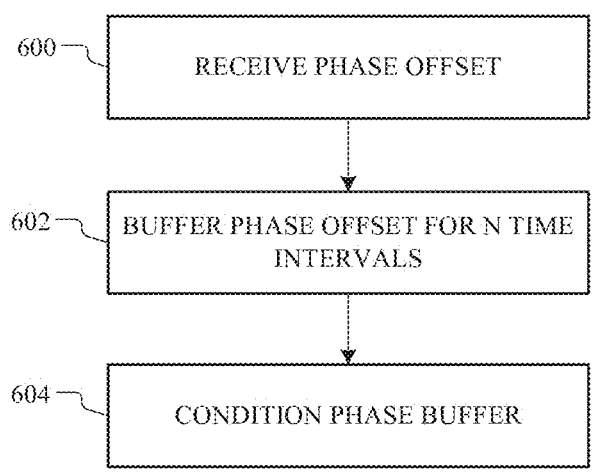
FIG. 6 is a flow chart depicting example operations of a method of filtering the output of an optical encoder.
Figure 7:
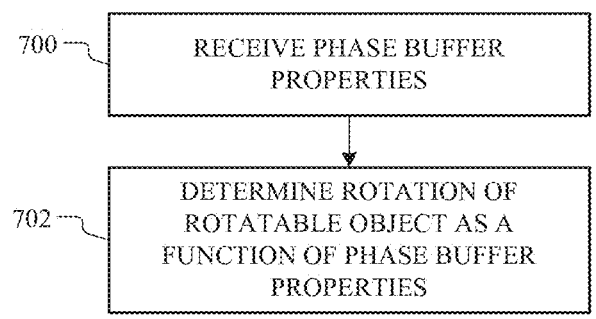
FIG. 7 is a flow chart depicting example operations of a method of determining the rotation of an encoder wheel.

FIG. 6 is a flow chart depicting example operations of a method of filtering the output of an optical encoder. The method can begin at 600 at which a phase offset value associated with a particular snapshot is received. Next, at operation 602, the received phase offset value can be added to a phase offset buffer of a particular length. As one example the phase offset buffer may have N length such that N phase offset values can be stored therein. Once the phase buffer is filled, the phase buffer can be conditioned at operation 604. Conditioning the phase buffer can include a number of distinct operations. For example, in some embodiments, conditioning the phase buffer can include applying statistical smoothing or other adjustments to one or more phase offset values. As one example, the phase buffer can be passed through a low pass filter. In another embodiment, the phase buffer values can be augmented based on a rolling average or interpolation FIG. 7 is a flow chart depicting example operations of a method of determining the rotation of an encoder wheel. The method can begin at operation 700 at which a phase buffer is received. After the phase buffer is received at 700, various properties of the phase buffer can be determined. For example, the discrete derivative of the phase buffer, can be calculated. The discrete derivative of a series of phase offset values can represent or correlate to the instantaneous speed at which the rotatable object is rotating. More particularly, if sequential phase offset values do not change by more than a marginal rate, then the pattern reflected onto the array of sensors has not changed, and thus, the rotatable object remains still. On the other hand, if sequential phase offset values change at a rapid rate, then the pattern reflected onto the array of sensors is changing rapidly, and thus, the rotatable object can be determined to be spinning.

After the phase buffer is received, the method can continue to 702 in which the rotation of the rotatable object can be calculated. As described above, the phase offset can be, in many embodiments, proportional to the rotation of the rotatable object depending upon the number of times the pattern of a patterned surface repeats. For example, certain embodiments can include a repeating pattern such as shown in FIGS. 3A and 3C. In such a case, alternating stripes of black and white can be disposed on to the surface of a shaft. As illustrated in FIG. 3C, eight pairs of black and white stripes are formed on the surface of the shaft. Accordingly, a measured phase for a full period of the pattern can correspond to one eighth of a full rotation of the shaft. More generally, the angle of the rotatable object can correlate to the phase within the phase offset buffer proportionately.

Figure 8:
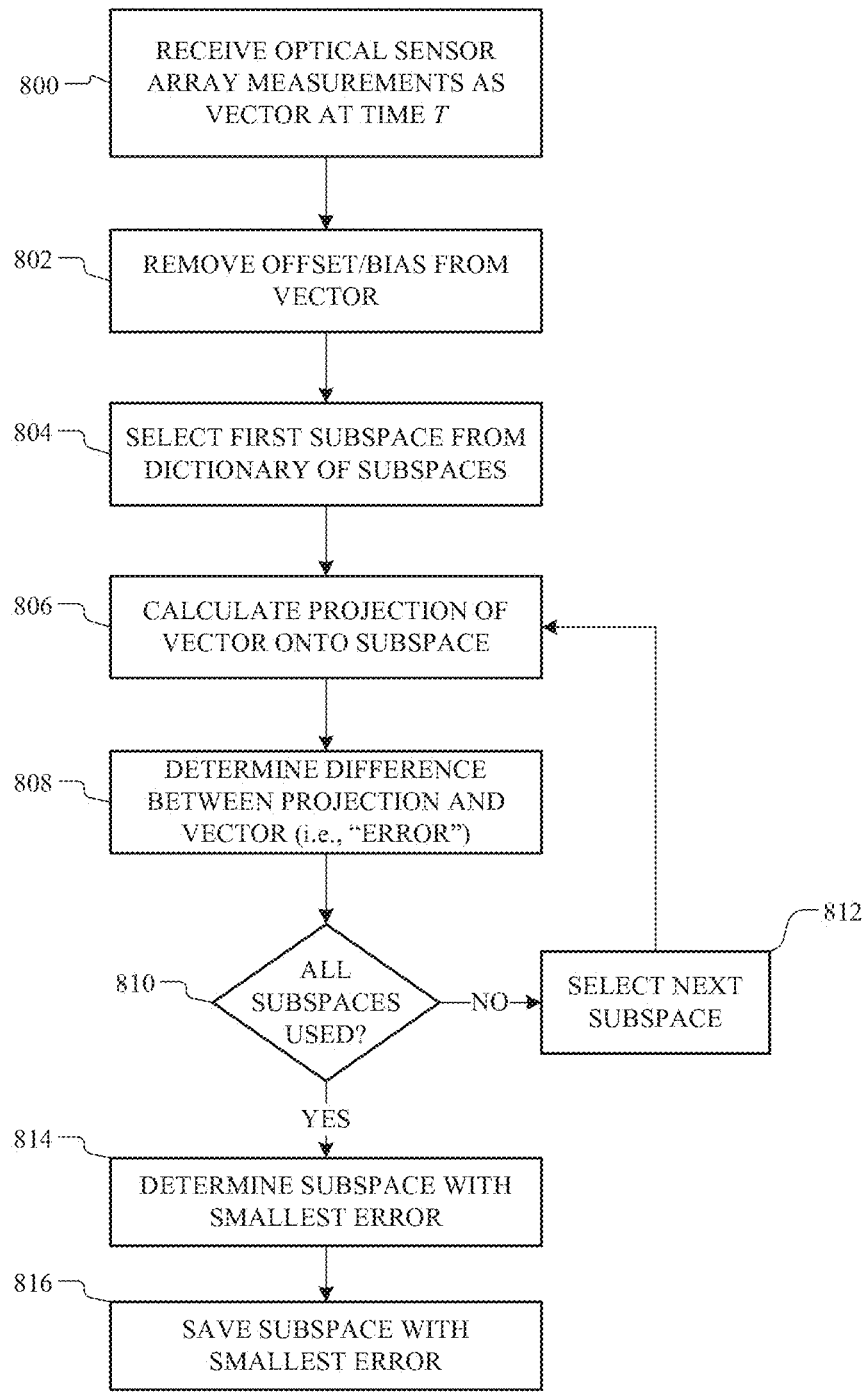
FIG. 8 is a flow chart depicting example operations of a method of selecting a vector subspace for filtering the output of an optical encoder.

FIG. 8 is a flow chart depicting example operations of a method of selecting a vector subspace for filtering the output of an optical encoder. The method can begin at operation 800 at which a snapshot vector, in the form of optical sensor array measurements, can be received. At 802, any offset or bias can be removed from the snapshot vector. At 804, a first subspace from a dictionary of subspaces can be selected. For example, a first subspace can be a subspace spanned by orthogonal sinusoidal vectors having a selected period. In another examples, the subspace can be spanned by a portion of a full period of orthogonal sinusoidal vectors having a selected period. Next, at 806, the projection of the snapshot vector onto the selected subspace can be calculated. Thereafter at 808, the error between the snapshot vector and the projection can be determined by subtracting the projection from the snapshot vector. Next at 810, the method may determine whether all subspaces have been used. If more subspaces remain, the method can continue to operation 812 which can select the next subspace from the dictionary of subspaces, correspondingly repeating steps 806 and 808.

However, as noted with respect to some embodiments described herein, certain embodiments only a single subspace can be used. In these embodiments, selection of a subspace may not be required.

However, once no remaining subspaces are present, the method can continue to 814 at which the method can determine which subspace exhibited the smallest error in comparison to the snapshot vector. The vector with the smallest error can be saved for future use at operation 816.

Although embodiments described herein relate to measuring the rotation of an object, one may appreciate that the same systems and methods can equally apply to measure the shift, translation, or movement of any pattern across a plurality of sensors. As one example, the embodiments described herein need not be only applicable to rotation information, but can equally apply to detection of linear motion, position, speed, and/or direction.

In still further embodiments, optical sensing need not necessarily be required. For example, methods described herein relate to finding the phase difference of a pattern across a plurality of optical sensors. In other examples, other types of sensors can be used. For example, acoustic sensors, pressure sensors, force sensors, capacitive sensors, electrical sensors, magnetic sensors, fluid sensors, and the like.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order, or fewer or additional steps may be required or desired for particular embodiments.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed. It will be apparent to one of ordinary skill in the art that many modifications and variations are possible in view of the above teachings. In particular, any features described with respect to one embodiment may also be used in some embodiments, where compatible. Likewise, the features of the different embodiments may be exchanged, substituted, or omitted where compatible and appropriate.

We claim:

1. An optical encoder comprising:
   a rotating shaft having a patterned surface;
   a light source positioned below the rotating shaft and configured to illuminate the patterned surface;
   an array of optical sensors positioned below the rotating shaft and each configured to receive at least a portion of a reflection of the patterned surface; and
   a processing device configured to perform the operations of:
   capturing a snapshot vector, each entry corresponding to an output of a respective one of the array of optical sensors;
   determining a projection of the snapshot vector onto a selected subspace;
   determining a phase for the snapshot vector based at least in part on a ratio of scalar coefficients of the determined projection; and
   determining a rotation of the rotating shaft based on the determined phase.

2. The optical encoder of claim 1, the processing device further configured to perform the operations of:
   capturing a plurality of snapshot vectors;
   determining a respective projection of each of the plurality of snapshot vectors onto a selected subspace;
   determining a phase for each snapshot vector based at least in part on a ratio of scalar coefficients of the respective projection; and
   determining a rotation of the rotating shaft based on the determined phase of each snapshot vector.

3. The optical encoder of claim 1, wherein each optical sensor of the array of optical sensors comprise one of the group consisting of photodiode, photoresistor, phototransistor, and optical image sensors.

4. The optical encoder of claim 1, further comprising subtracting the projection from the snapshot vector to determine an error vector.

5. The optical encoder of claim 1, wherein the selected subspace is based on an expected reflection pattern of the illuminated patterned surface onto the array of optical sensors.

6. The optical encoder of claim 5, wherein the selected subspace comprises a sinusoidal vector.

7. A method for determining the position of a pattern relative to a plurality of sensors, comprising:
   capturing a snapshot vector, each entry corresponding to an output of a respective one of the plurality of sensors;
   determining a projection of the snapshot vector onto a selected subspace;
   determining a phase of the pattern based on a ratio of scalar coefficients of the determined projection; and
   determining the position of the pattern relative to the plurality of sensors based on the determined phase of the pattern.

8. The method of claim 7, wherein each of the plurality of sensors comprises an optical sensor.

9. The method of claim 8, wherein each optical sensor comprises one of the group consisting of photodiode, photoresistor, phototransistor, and optical image sensors.

10. The method of claim 7, further comprising subtracting the projection from the snapshot vector to determine an error vector.

11. The method of claim 7, wherein the selected subspace is based on an expected reflection pattern of the illuminated patterned surface onto the array of optical sensors.

12. The method of claim 11, wherein the selected subspace comprises a sinusoidal vector.

13. A method for determining the angular position of a rotatable object having a patterned surface, the method comprising:
   illuminating the patterned surface with a light source;
   receiving, by a plurality of optical sensors, light reflected from the patterned surface;
   capturing a snapshot vector having entries corresponding to the values of each of the plurality of optical sensors;
   determining a projection of the snapshot vector onto a selected subspace;
   determining the phase of the pattern based on a ratio of scalar coefficients of the determined projection; and
   determining the angular position of the rotatable object based on the phase of the pattern.

14. The method of claim 13, wherein each optical sensor of the plurality of optical sensors comprises one of the group consisting of photodiode, photoresistor, phototransistor, and optical image sensors.

15. The method of claim 13, further comprising subtracting the projection from the snapshot vector to determine an error vector.

16. The method of claim 13, wherein the selected subspace is based on an expected reflection pattern of the illuminated patterned surface onto the array of optical sensors.

17. The method of claim 13, wherein the selected subspace comprises a sinusoidal vector.

18. The method of claim 13, wherein the rotatable object is associated with an input device of a portable electronic device.

19. The method of claim 13, wherein the plurality of optical sensors are arranged in a pattern.

20. The method of claim 13, wherein the light source comprises a light emitting diode.

* * * * *